United States Patent
Drew et al.

(10) Patent No.: US 12,436,009 B2
(45) Date of Patent: Oct. 7, 2025

(54) MEASUREMENT OF MULTI-PHASE WELLBORE FLUID

(71) Applicant: Halliburton Energy Services, Inc., Houston, TX (US)

(72) Inventors: Julian Drew, Aurora, CO (US); Barry Fish, Arvada, CO (US); Crispin Doyle, Swindon (GB); Cole Aaron Grandjean, Santa Fe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 208 days.

(21) Appl. No.: 18/173,650

(22) Filed: Feb. 23, 2023

(65) Prior Publication Data
US 2024/0288291 A1   Aug. 29, 2024

(51) Int. Cl.
*G01F 1/661*   (2022.01)
*G01F 1/74*    (2006.01)

(52) U.S. Cl.
CPC ............... *G01F 1/661* (2013.01); *G01F 1/74* (2013.01)

(58) Field of Classification Search
CPC .................................. G01F 1/661; G01F 1/74
See application file for complete search history.

(56) References Cited

U.S. PATENT DOCUMENTS

| | | | |
|---|---|---|---|
| 6,698,297 B2 | 3/2004 | Gysling | |
| 10,087,751 B2 | 10/2018 | Stokely | |
| 10,605,728 B2 | 3/2020 | Coonrod et al. | |
| 2016/0154142 A1* | 6/2016 | Stokely | G01V 11/002 73/152.58 |

(Continued)

FOREIGN PATENT DOCUMENTS

| | | |
|---|---|---|
| CN | 201449306 U | 5/2010 |
| CN | 102116692 A | 7/2011 |
| CN | 102937465 A | 2/2013 |

(Continued)

OTHER PUBLICATIONS

Munoz-Cobo, et al., "Development of Conductivity Sensors for Multi-Phase Flow Local Measurements at the Polytechnic University of Valencia (UPV) and University Jaume I of Castellon (UJI)", Sensors, vol. 17, No. 5, May 10, 2017, pp. 1-35.

(Continued)

*Primary Examiner* — Peter J Macchiarolo
*Assistant Examiner* — Timothy P Graves
(74) *Attorney, Agent, or Firm* — Kilpatrick Townsend & Stockton LLP (57) ABSTRACT

A system for determining one or more characteristics of a multiphase fluid flow within a flow line of a hydrocarbon well. The system can include a multiphase flow metering probe, a measurement device, and a computing device. The multiphase flow metering probe may comprise a unitary assembly of components including an optical fiber cable, at least one flow conditioning element, at least one optical sensor, and a mounting component designed to secure the multiphase flow metering probe within the flow line. Signals generated by the at least one optical sensor of the multiphase flow metering probe can be received by the measurement device and subsequently transmitted to the computing device for determining various characteristics of the multiphase fluid flow.

20 Claims, 5 Drawing Sheets

(56) References Cited

U.S. PATENT DOCUMENTS

2017/0198574 A1* 7/2017 Donzier ............... E21B 47/113
2019/0242792 A1   8/2019 Knight

FOREIGN PATENT DOCUMENTS

| CN | 102944269  A  | 2/2013 |
|----|---------------|--------|
| CN | 205373933  U  | 7/2016 |
| CN | 110243532  A  | 9/2019 |
| CN | 112284430  A  | 1/2021 |
| CN | 113431553  A  | 9/2021 |
| EP |   3190400 A1  | 7/2017 |
| JP |   3105253 B2  | 9/2000 |
| WO |   9313391 A1  | 7/1993 |
| WO | 2005085590 A1 | 9/2005 |
| WO | 2015016936 A1 | 2/2015 |
| WO | 2015026324 A1 | 2/2015 |

OTHER PUBLICATIONS

PCT/US2023/063164, "International Search Report and the Written Opinion", Jun. 20, 2023, 12 pages.

* cited by examiner

MEASUREMENT OF MULTI-PHASE WELLBORE FLUID

TECHNICAL FIELD

The present disclosure relates generally to wellbore operations, and more particularly although not necessarily exclusively, to metering of multiphase fluid flows during production operations for a wellbore.

BACKGROUND

Understanding the nature of the outflow from a well can allow a hydrocarbon well operator to better control and maximize production operations. But, as operators move to more complete recovery of oil and gas deposits, and as unconventional production has increased, multiphase outflow is more typical. Multiphase in situ flow metering is desirable for measuring individual phase flow rates or other flow characteristics of multiphase flows, as well as for well production analysis and allocation, among other uses.

DETAILED DESCRIPTION

Certain aspects and examples of the present disclosure relate to a fiber-optic based multiphase flow metering probe that includes both sensor and flow conditioning elements as part of a unitary assembly that can be installed directly into a fluid flow. A multiphase flow metering probe can also include an acoustic sensor for further monitoring and resolving multiphase fluid flow. The multiphase flow metering probe can be installed, for example, into a conduit such as a wellbore flow line, to provide for in situ metering of a multiphase fluid flowing within the flow line.

The flow conditioning element(s) of the multiphase flow metering probe can be attached to or integral with an elongate support rod, and can operate to, for example, smooth the fluid flow or create a change in pressure of the fluid flow at a given location along the length of the multiphase flow metering probe. The multiphase flow metering probe is fiber-optic based in the sense that an optical fiber cable can extend within the support rod of the probe and function as an optical waveguide to transmit signals generated by at least one optical sensor residing within the support rod.

In contrast to existing multiphase flow metering techniques, a fiber-optic based multiphase flow metering probe that includes at least one flow conditioning element and at least one optical sensor and is installable as a unitary assembly directly within a fluid flow, as discussed herein, can be utilized to provide accurate, efficient, and cost effective in situ multiphase flow metering. The inclusion of a flow conditioning element as a part of a multiphase flow metering probe can facilitate the removal of fluid flow turbulence or an otherwise smoothing of the flow within which the multiphase flow metering probe is installed, without the need for external flow conditioning devices. Additionally, the all fiber-optic design of the flow metering probe obviates any concerns about using the flow metering probe in, for example, hazardous environments with restrictions on the use of devices than can generate heat or otherwise act as an ignition source that could result in a fire or an explosion. Integrating all the flow conditioning elements, optical sensors, acoustic sensors, and any other utilized elements into a single insertable unitary assembly also greatly simplifies installation, servicing, replacement, and decommissioning operations in comparison to other multiphase flow metering solutions.

One or more optical sensors of a multiphase flow metering probe can be selectively located relative to one or more flow conditioning elements according to one or more examples of the present disclosure to produce certain desired physical measurements, such as but not limited to differential pressure. In the case of a vertically-oriented multiphase flow metering probe installation, the ability to measure the pressure differential in a flow at two vertically separated points also provides flow density information.

Examples of a multiphase flow metering probe according to the present disclosure can be high-bandwidth, multiphysics sensing probes. High-bandwidth data acquisition functionality can allow for the full dynamic nature of a given flow to be recorded and analyzed, in addition to the direct recording of high-frequency acoustic signals. For example, data sampling using one or more examples of a multiphase flow metering probe according to the present disclosure can occur at a rate in the multiple kilohertz range.

According to some examples of the present disclosure, one or more pressure sensors and one or more separate temperature sensors may be used with a single multiphase flow metering probe, as opposed to utilizing integrated temperature compensated pressure measurement sensors. This allows for more selective location of the one or more pressure and the one or more temperature sensors on the multiphase flow metering probe, and for correspondingly greater control over the measurements provided by the multiphase flow metering probe. Examples according to the present disclosure may also utilize other sensors, such as without limitation, strain or force measurement sensors.

According to some examples of the present disclosure, a multiphase flow metering probe can be centrally axially (e.g., concentrically) located as a unitary assembly within a conduit carrying a flow of interest, as opposed to being installed tangentially (i.e., exterior) to the flow as are some existing flow metering solutions. The central axial location of the multiphase flow metering probe within a conduit helps to ensure that the multiphase flow metering probe is substantially centered in the flow, where the flow is less likely to be affected by the wall(s) or other aspects of the conduit.

Multiphase flow metering probe examples according to the present disclosure can be installed in a conduit that is arranged vertically relative to the ground. In a vertical installation, there may be a homogeneous mixture of fluid phases flowing through the conduit (i.e., a homogenized flow), which may change over time. Alternatively, a multiphase flow metering probe can be installed in a conduit that is arranged horizontally relative to the ground. In a horizontal installation, there may be a vertical separation of fluid phases flowing through the conduit (i.e., a stratified flow).

A multiphase flow metering probe according to the present disclosure can be used to determine one or more phases of the mulitphase flow, and to measure the overall flow rate of a multiphase fluid flowing through a conduit, as well as the flow rate of each individual phase of the multiphase fluid. One or more examples of a multiphase flow metering probe according to the present disclosure can also be used to measure or infer various other characteristics of a multiphase flow, such as for example and without limitation, temperature (e.g., absolute temperature), absolute pressure, differential pressure, flow velocity, flow density, acoustic velocity, and doppler effects. On or more examples of a multiphase flow metering probe may be equipped with appropriate flow conditioning elements and optical sensors to meter a single-phase flow, a two-phase flow (e.g., liquid/liquid or gas/liquid), a three-phase flow (e.g., liquid/liquid/gas), or flows having a different combination of phases.

According to another aspect of the present disclosure, a multiphase flow metering system can include multiphase flow metering probes installed in a flow line or other conduit of each of a plurality of wells of a multiple-well field. Further coupling of the individual well metering with the metering of total production for all the collective wells, can allow for direct derivation of production allocation between each of the individual wells. In this regard, data generated by the multiphase flow metering probes can be provided to a computing device running software that can collectively analyze the data and can determine a flow allocation model that accurately assigns a portion of the collective well production to each well. Data received from the multitude of flow metering probes can also be utilized by a production optimization model to actively control production, such as by automatically adjusting a choke to control flow.

A multiphase flow metering probe located in a wellbore flow line can be used for various applications. Such applications can include, for example, production monitoring, production control, and production optimization. Other applications of a multiphase flow metering probe located in a wellbore flow line can include modeling and simulation, monitoring of single well completion performance, monitoring of multi-well completion performance and interaction, well planning (e.g., single well completion design, multi-well completion design, etc.), and well spacing Flow measurements produced by a multiphase flow metering probe can be used with respect to machine-learning techniques. For example, measurements from a multiphase flow metering probe can be used to train machine-learning models, to use machine-learning techniques for optimizing control systems, and the like. According to examples of the present disclosure, machine learning techniques can be used to, for example, update various types of models, including fluid models. Instead of relying solely on physics-based models or laboratory measurement of fluid properties, machine learning techniques according to the present disclosure can also be used to estimate fluid properties such as without limitation, viscosity or density. Machine learning techniques may also be employed to perform what may be considered a self-calibration operation, whereby a model can be trained on collective data obtained from multiple flow metering probes that are respectively associated with multiple wells, and where the fluid outflows from each of the wells have common or different fluid properties.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
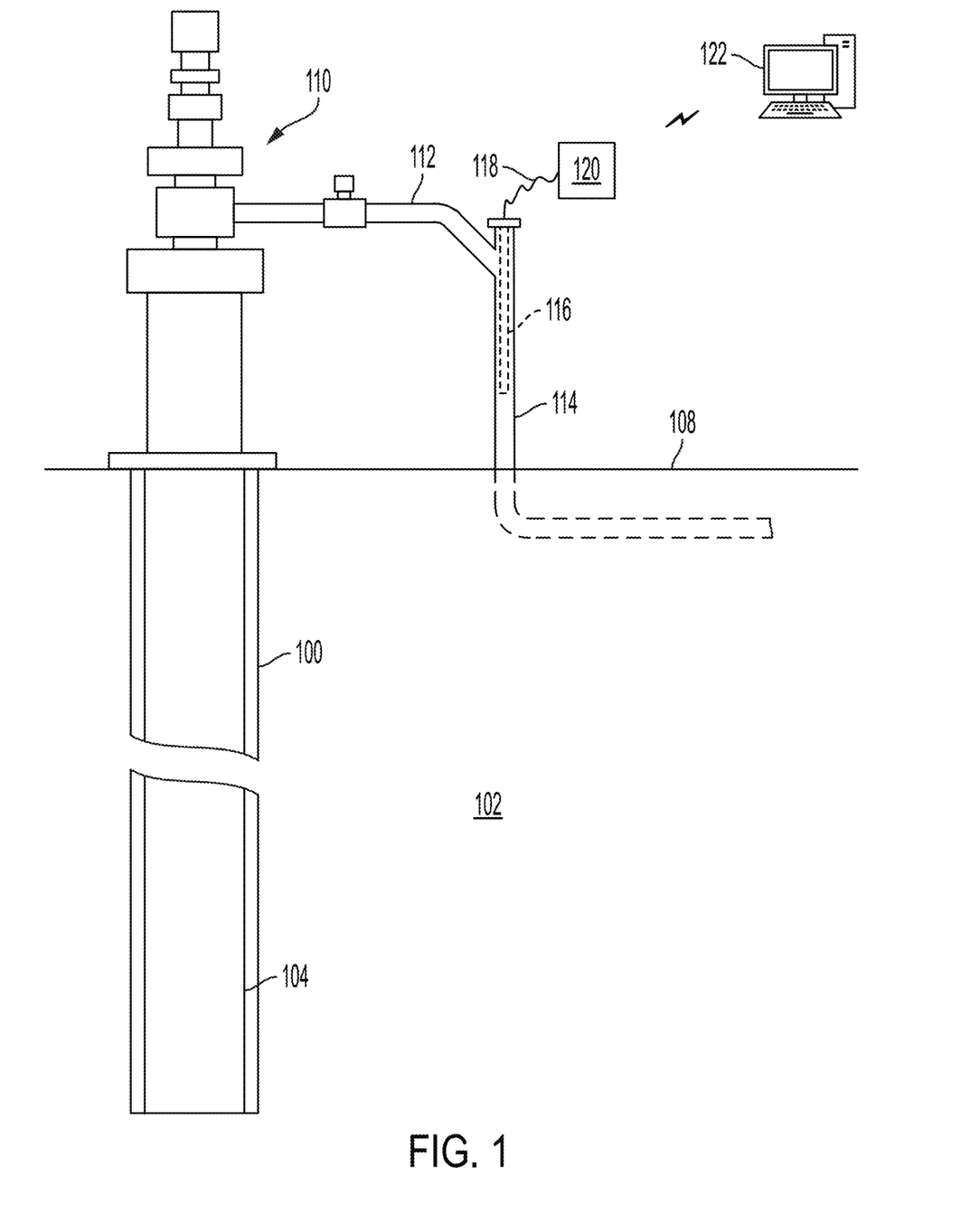
FIG. 1 is a schematic diagram of a producing well according to one example of the present disclosure.

FIG. 1 is a diagram of a wellbore 100 according to one example of the present disclosure. The wellbore 100 can be formed in a subterranean formation 102 or, alternatively or additionally, in a sub-oceanic formation. The wellbore 100 can be a first wellbore in a set of wellbores of a multi-well pad or other suitable structure or system. The wellbore 100 can include a casing 104 or other suitable component (e.g., a tubing string, etc.) that can transport produced fluid from the wellbore 100 to the surface 108. The outflow of fluid from the casing 104 of the wellbore 100 is controlled by various components of a wellhead 110 and is transferred therefrom to a downstream location via a flow line 112. In this example, the flow line 112 includes a substantially horizontal section that is connected to the wellhead and a vertical section 114 within which is located one example of a multiphase flow metering probe 116 according to the present disclosure. A free end of an optical fiber cable 118 of the multiphase flow metering probe 116 extends from an attachment element of the multiphase flow metering probe and can be connected to a measurement device 120 as shown. Flow data from the measurement device 120 can be transmitted or otherwise provided to a computing device 122 that can analyze and use the data for various purposes, as described above.

Figure 2:
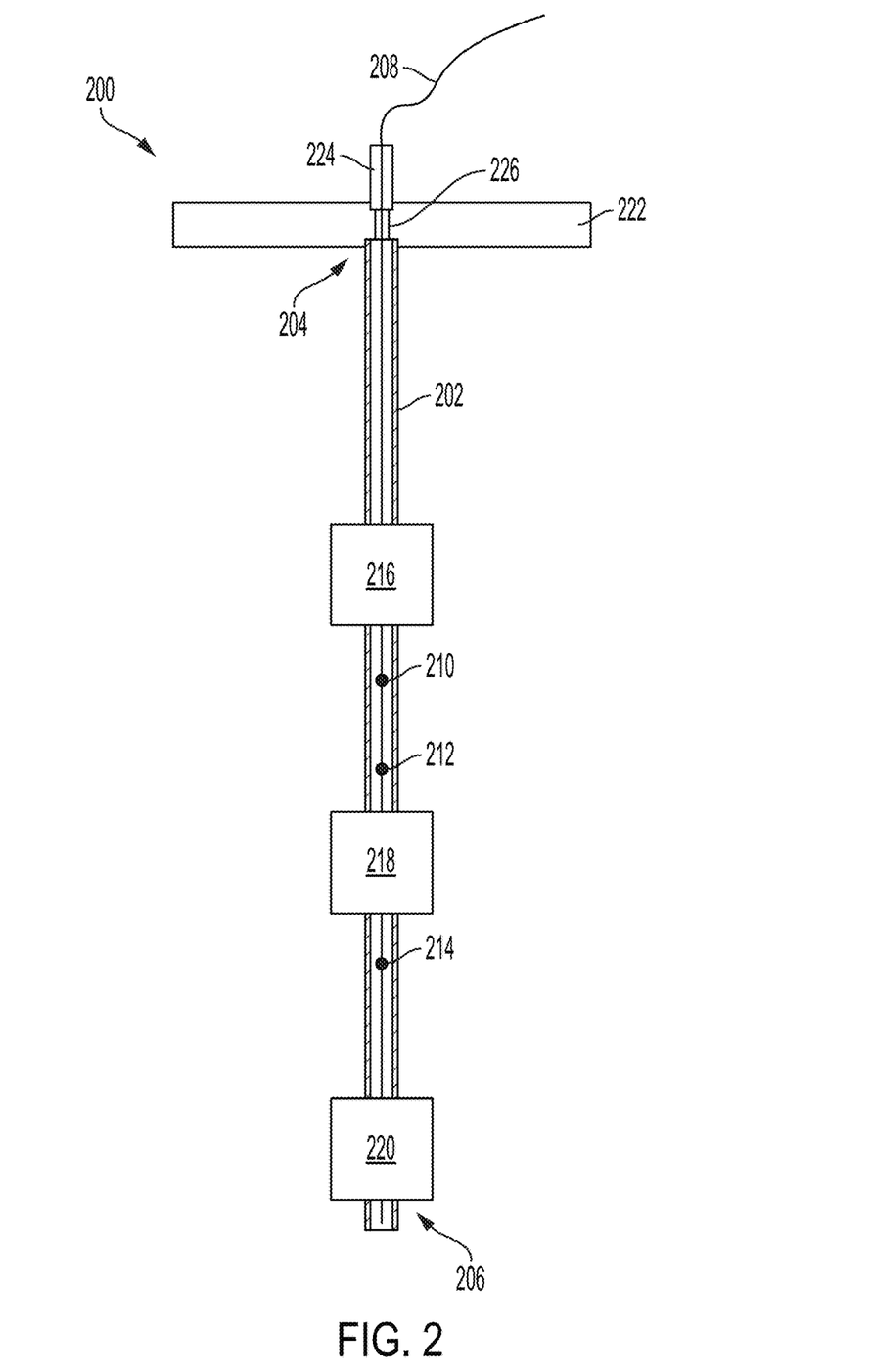
FIG. 2 is a schematic representation of one example of a multiphase flow metering probe according to one example of the present disclosure.

FIG. 2 is a schematic representation of one example of a multiphase flow metering probe 200 according to the present disclosure. The multiphase flow metering probe 200 includes an elongate support rod 202 of some length. In the example of FIG. 2, the support rod 202 has a hollow interior and is shown in cross-section to expose the rod interior for purposes of illustration. The cross-sectional dimension of the support rod 202 has also been exaggerated for clarity. In some examples that utilize a hollow support rod, the hollow interior of the support rod can be filled with a fluid that protects the optical fiber cable. The fluid within the support rod may be in pressure equilibrium with the fluid flow within which the multiphase flow metering probe is located, such as through use of, for example, a single port (for pressure sensing) or multiple ports (for differential pressure sensing), and one or more diaphragms may be employed to keep the fluids separated. In other examples according to the present disclosure, the support rod may be substantially solid, as described in more detail below.

The support rod 202 includes an upstream end 204 and a downstream end 206. At least the downstream end 206 of the support rod 202 may be closed. While the support rod 202 is depicted in FIG. 2 with a circular cross-sectional shape, the support rods of other probe examples can have other cross-sectional shapes. The support rod 202 can include some degree of flexibility but is preferably able to resist excessive bending that might cause permanent deformation or damage when the support rod is subjected to the forces produced by a fluid flow. The material from which the support rod 202 is constructed may depend, at least in part, on the composition of the fluid flow into which the multiphase flow metering probe 200 will be installed.

The multiphase flow metering probe 200 is shown to include an optical fiber cable 208 that extends along the length of the support rod 202—in this case, within the hollow interior thereof. In other examples, the support rod can be substantially solid in nature. For example, and without limitation, an optical fiber cable may be located within a hollow tube and the tube may be subsequently filled with an epoxy resin or another suitable material. In another example, a groove may be created within solid rod and an optical fiber cable may be embedded in the groove. In still another non-limiting example, a solid rod may be manufactured with an optical fiber cable integrated therein.

The optical fiber cable 208 functions as an optical waveguide for transmitting signals generated by optical sensors. An exposed upstream end of the optical fiber cable 208 is shown to extend from an upstream end of the multiphase flow metering probe 200 for connection to a fiber optic interrogator (data acquisition system). In some examples of the multiphase flow metering probe 200, the optical fiber cable 208 may be a single strand optical fiber cable. In other examples of the multiphase flow metering probe 200, the optical fiber cable 208 may be a multi-strand optical fiber cable. In any case, the optical fiber cable 208 is protected by the support rod 202 from possible negative effects of a fluid flow into which the multiphase flow metering probe 200 will be installed.

One or more optical sensors may be utilized in one or more examples of a multiphase flow metering probe according to the present disclosure. As schematically illustrated in FIG. 2, the multiphase flow metering probe 200 includes a plurality of optical sensors 210, 212, 214 that reside within the hollow interior of the support rod 202. In the case of the multiphase flow metering probe 200 example of FIG. 2 and in other examples, including examples employing a substantially solid support rod, the optical sensors 210, 212, 214 may be integral to the support rod 202 such that the optical sensors can measure the strain or force associated with a deformation of the support rod 202 caused by a fluid flow into which the multiphase flow metering probe 200 is installed. Like the optical fiber cable 208, the optical sensors 210, 212, 214 can also be protected by the structure of the support rod 202 from possible negative effects of a fluid flow into which the multiphase flow metering probe 200 will be installed.

The optical sensors 210, 212, 214 are also communicatively coupled with the optical fiber cable 208. According to the present disclosure, an optical sensor is considered to be communicatively coupled to the optical fiber cable 208 either through a physical connection between the optical fiber cable 208 and a separate optical sensor, by integrating an optical sensor directly into a strand of the optical fiber cable 208 (e.g., as in the case of a fiber Bragg grating sensor), or by using a strand of the optical fiber cable 208 as a sensor (e.g., as in the case of some light scattering-based temperature measurement techniques). In any case, signals generated by the optical sensors 210, 212, 214 are transmitted along the optical fiber cable 208.

In some examples according to the present disclosure, an optical sensor can be a fiber Bragg grating (FBG) sensor that is integrated directly into a strand of the optical fiber cable of the multiphase flow metering probe. For example, one or more of the optical sensors 210, 212, 214 depicted in FIG. 2 may be FBG sensors. FBG sensors can be used to measure various fluid flow characteristics, such as, but not limited to, temperature, pressure, and acoustic output, and can also be used to measure strain, such as strain produced on the support rod 202 by a fluid flow. Therefore, while multiphase flow metering probe examples according to the present disclosure are in no way limited to the use of FBG sensors, FBG sensors are well suited to use in a multiphase flow metering probe. When a plurality of optical sensors of a multiphase flow metering probe according to the present disclosure are FBG sensors, all of the plurality of FBG sensors may be integrated into a single strand of the optical fiber cable. Alternatively, each FBG sensor can be integrated into a unique strand of the optical fiber cable, or certain ones of the plurality of FBG sensors may share a given strand of the optical fiber cable. FBG sensors, and other optical sensors, of one or more examples of a multiphase flow metering probe, may also be multiplexed.

In the multiphase flow metering probe 200 example of FIG. 2, the optical sensor 210 is an optical temperature sensor, and each of the optical sensors 212 and 214 are optical pressure sensors. In other examples according to the present disclosure, different combinations of optical sensors and different optical sensor locations may be utilized. A given multiphase flow metering probe may also have a greater or lesser number of optical sensors than the multiphase flow metering probe 200 shown in FIG. 2. For example, an optical strain sensor or an optical force sensor may also be located in the area of one or both of the optical temperature sensor 210 and the upstream optical pressure sensor 212. The optical sensors of a given multiphase flow metering probe can be selectively placed along the length of the support rod, and the physical measurement made by each optical sensor may be governed, at least in part, by the position of the optical sensor within the support rod and with respect to one or more flow control elements, as described in more detail below.

As also depicted in FIG. 2, one or more examples of a multiphase flow metering probe according to the present disclosure can further include one or more flow conditioning elements. In the case of the multiphase flow metering probe 200, a first flow conditioning element 216 is attached to or integral with an outside surface of the support rod 202. In this example, the first flow conditioning element 216 is a flow smoothing device designed to reduce turbulence in the multiphase fluid flowing through a conduit into which the probe will be installed. In one or more examples according to the present disclosure, a flow smoothing device can be, for example, a folded vane flow conditioner, a tube-type flow conditioner, a fin-type flow conditioner, a Zanker-type flow conditioner, a fin-type flow conditioner, or a flow plate.

As indicated in FIG. 2, the first flow conditioning element 216 is preferably located upstream of the optical sensors 210, 212, 214 of the multiphase flow metering probe 200. In this manner, the optical sensors 210, 212, 214 can measure a more uniform and predictable fluid flow instead of a randomly turbulent fluid flow, which can result in more accurate and consistent measurements.

The multiphase flow metering probe 200 of FIG. 2 is also shown to include a second flow conditioning element 218 that is attached to or integral with an outside surface of the support rod 202. The second flow conditioning element 218 is positioned on the support rod 202 at a location that is downstream of the first flow conditioning element 216. When a second flow conditioning element, such as the second flow conditioning element 218, is utilized with a multiphase flow metering probe according to one or more examples of the present disclosure, the second flow conditioning element may have various functions. For example, a second flow conditioning element may be used to create a temporary pressure change in the fluid flowing through the conduit into which the multiphase flow metering probe is installed. Such a pressure change may be effectuated by, without limitation, employing a second flow conditioning element in the form of a flow restricting device such as a venturi device or an orifice plate that is designed to create a pressure change in the fluid flow by altering the flow velocity. In the case of the multiphase flow metering probe 200 of FIG. 2, utilizing a second flow conditioning element 218 in the form of a reverse venturi that creates a localized pressure change in the fluid flowing through the conduit into which the multiphase flow metering probe 200 is installed, allows for measurement of differential pressure using readings from the optical (pressure) sensor 212 located upstream of the second flow conditioning element 218 and pressure readings from the optical (pressure) sensor 214 located downstream of the second flow conditioning element 218.

As additionally shown in FIG. 2, the multiphase flow metering probe 200 may include an acoustic element 220. In the example of the multiphase flow metering probe 200 illustrated in FIG. 1, the acoustic element 220 is attached to the support rod 202 near the downstream end 206 thereof. In this position, any effects of the acoustic element 220 on a fluid flow are substantially removed from influencing measurements taken by the optical sensors 210, 212, 214. Nonetheless, when an acoustic element is employed in other examples, the acoustic element may be located elsewhere relative to the support rod or to the optical sensors of the multiphase flow metering probe. More than one acoustic element may also be used.

The acoustic element 220 is preferably a high-frequency device. That is, the acoustic output (i.e., vibrations/oscillations) produced by the acoustic element in response to placement in a fluid flow is preferably in a high-frequency bandwidth. The acoustic element 220 may be selected from various types of devices. For example, the acoustic element 220 may be a resonant cavity/chamber such as but not limited to a whistle, a fluidic oscillator such as but not limited to an asymmetric fluidic oscillator, or a resonant device such as but not limited to a tuning fork or a similar device. The acoustic element preferably induces vibrations/oscillations in the fluid flow, such as, for example, by causing vortex shedding. The frequency and resonant frequency of the vibrations/oscillations caused by the acoustic element 220 are related to properties of the fluid within which the multiphase flow metering probe 200 is located. Therefore, fluid properties such as but not necessarily limited to fluid density and fluid viscosity can be determined by measuring the frequency and/or resonant frequency of the fluid vibrations/oscillations caused by the acoustic element 220. The acoustic element 220 can be associated with an optical sensor, such as a FBG sensor, such that strain resulting from vibrations/oscillations of the acoustic element can be measured by the optical sensor.

The acoustic element 220 may also be a multi-port acoustic device that is comprised of some combination of the aforementioned devices, and possibly also a venturi. When the acoustic element 220 is a multi-port acoustic device, each port may be associated with an optical sensor, such as a FBG sensor. Collective acoustic signals emanating from the multi-port acoustic device may then be resolved and associated with a particular port according to a difference in the frequency of the signals, which can be used to detect differences in fluid/fluid properties flowing through each port of the multi-port acoustic device.

The nature of a given multiphase fluid flow into which the multiphase flow metering probe 200 may be installed can vary considerably. In addition to likely being very energetic, the composition of the fluid flow at any point in time may vary from, for example, multiphase to single phase. Further, a fluid flow leaving a wellhead and transitioning to a flow line frequently produces slugs, which may appear randomly and can create an acoustic signature within the fluid flow. Thus, a fluid flow to be monitored by the multiphase flow metering probe 200 may be highly dynamic in nature. While not required by the present disclosure, use of the acoustic element 220 can help the multiphase flow metering probe 200 better determine the full dynamic nature of the fluid flow by producing analyzable acoustic signals that vary according to the characteristics of the fluid flow.

A probe attachment element in the form of a probe mounting flange 222 (shown in cross-section for clarity) is located at the upstream end 204 of the support rod 202. The probe mounting flange 222, together with the support rod 202, the optical sensors 210, 212, 214, the first and second flow conditioning elements 216, 218, and the acoustic element 220, forms a multiphase flow metering probe 200 that may be installed to a pipe or other conduit as a unitary assembly.

A central axis of the support rod 202 is preferably aligned with a central axis of the probe mounting flange 222. For example, in the case of the multiphase flow metering probe 200 depicted in FIG. 2, the support rod 202 is arranged substantially concentrically relative to the probe mounting flange 222. Such an arrangement of the support rod 202 with respect to the probe mounting flange 222 results in the support rod 202, the associated first and second flow conditioning elements 216, 218, the optical sensors 210, 212, 214, and the acoustic element 220, being substantially centrally axially located within the conduit to which multiphase flow metering probe 200 is installed and, consequently, substantially centered in the fluid flowing therein. In addition, one or both of the flow conditioning elements 216, 218, or the acoustic element 220, may incorporate centralizers to maintain the concentric positioning of the multiphase flow metering probe 200 relative to the vertical section of the flow line 114.

In the example of FIG. 2, the upstream end 204 of the support rod 202 is shown to be received and retained in a central bore on the underside of the probe mounting flange 222. In such an arrangement, the upstream end 204 of the support rod 202 may be retained in the probe mounting flange 222 by any technique known in the art, including, but not limited to, by way of threaded engagement, adhesive, fasteners, or welding. In one or more other examples according to the present disclosure, the upstream end 204 of the support rod 202 can pass completely through the probe mounting flange 222. A strain relief 224 or a similar mechanism can be used on the opposite side of the probe mounting flange 222 to secure the optical fiber cable 208 and to protect the optical fiber cable from damage by bending, pulling, etc. When present, the strain relief 224 may be retained in the probe mounting flange 222 in the same or a similar manner as the support rod 202. As further shown in FIG. 2, a through-bore 226 is also located in the probe mounting flange 222 to allow for passage of a free end of the optical fiber cable 208 through the probe mounting flange 222.

The size and shape of the probe mounting flange 222 can vary according to the conduit into which the multiphase flow metering probe 200 will be installed. For example, and as can be more clearly understood by reference to FIG. 4, the probe mounting flange 222 of the multiphase flow metering probe 200 shown in FIG. 2 has a round cross-sectional shape and a diameter that allows the probe mounting flange 222 to be securely attached to an open end of a conduit having a cooperating cross-sectional shape and diameter. As illustrated, the diameter or length and width dimension(s) of the probe mounting flange 222 will normally be substantially greater than the cross-sectional (e.g., diameter) dimension(s) of the support rod 202 of the multiphase flow metering probe 200.

The probe mounting flange 222 may be secured to an open end of a conduit by various techniques. For example, and without limitation, the probe mounting flange 222 may be secured to an open end of a conduit using a fastening mechanism comprising a plurality of threaded fasteners. Clamps and other fastening techniques that would be familiar to one of skill in the art may also be employed. In any case, the probe mounting flange 222 is preferably secured to the conduit in a sealing manner to ensure there are no leaks of the fluid flowing through the conduit. In this regard, the probe mounting flange 222 may be equipped with an integral sealing element, or a separate sealing element (e.g., a gasket) may be placed between the probe mounting flange 222 and a receiving portion of the conduit.

Figure 3A:
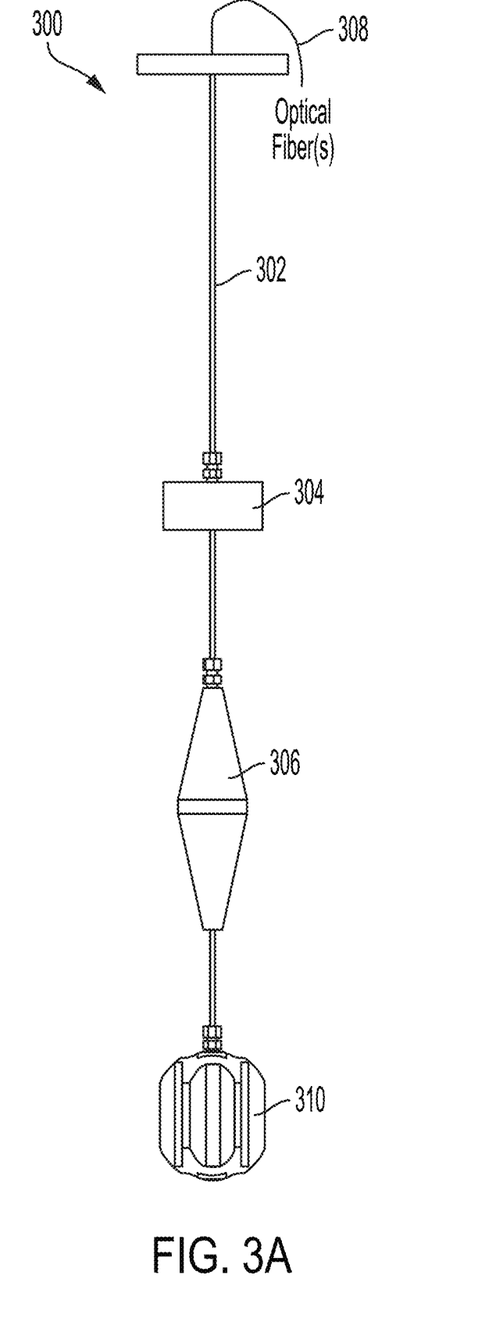
Fig. 3A is an assembled view of another multiphase flow metering probe according to one example of the present disclosure.

Fig. 3A is an assembled view of another multiphase flow metering probe 300 according to one example of the present disclosure, where the various components of the multiphase flow metering probe 300 are shown in more detail. The multiphase flow metering probe 300 includes an elongate support rod 302, with a first flow conditioning element 304 attached to or integral with an outside surface of the support rod 302, and a second flow conditioning element 306 attached to or integral with the outside surface of the support rod 302 at a location downstream of the first flow conditioning element 304. Each of the support rod 302, the first flow conditioning element 304, and the second flow conditioning element 306, can have the same or substantially the same respective function as the support rod 202, the first flow conditioning element 216, and the second flow conditioning element 218 of the multiphase flow metering probe 200 of FIG. 2. For example, the shape of the second flow conditioning element 306 of the multiphase flow metering probe 300 acts as a restriction to cause a localized increase in the velocity, and decrease in the pressure, of a fluid flow in which the multiphase flow metering probe 300 is installed.

While not visible in FIG. 3A, the multiphase flow metering probe 300 also includes one or more optical sensors that reside within the support rod 302, such as by being located in a hollow interior or a groove of the support rod, being embedded in the support rod, or in series with the support rod. The one or more sensors are communicatively connected to an optical fiber cable 308 that is located within and extends along a length of the support rod 302, and functions as an optical waveguide to transmit signals generated by the optical sensors to an optical interrogator or another signal receiving device in communication with a free end of the optical fiber cable 308. The one or more optical sensors of the multiphase flow metering probe 300 may be of the same or a similar construction as the optical sensors 210, 212, 214 of the multiphase flow metering probe 200 of FIG. 2, and may function in the same or a similar manner.

The number of optical sensors present in the multiphase flow metering probe 300 may again vary. For example, the multiphase flow metering probe 300 of Fig. 3A may have an optical temperature sensor that is located between the first and second flow conditioning elements 304, 306, a first optical pressure sensor located downstream of the optical temperature sensor but upstream of the second flow conditioning element 306, and a second optical pressure sensor located downstream of the second flow conditioning element 306. According to this example, the measurements that can be made by the multiphase flow metering probe 300 of FIG. 2 are similar to or the same as those that can be made by the multiphase flow metering probe 200 of FIG. 2. The multiphase flow metering probe 300 of FIG. 3A may also include an acoustic element 310. The acoustic element 310 may again be located near a downstream end of the multiphase flow metering probe 300. When present, the acoustic element 310 may be of the same or a similar construction as the acoustic element 220 of the multiphase flow metering probe 200 of FIG. 2, and may function in the same or a similar manner.

In some other examples, a multiphase flow metering probe according to the present disclosure may include an elongate support rod comprised of a plurality of support rod sections, and one or more strain sensors in the form of one or more load cells can be placed in series with the plurality of individual support rod sections and flow conditioning elements, etc., of the multiphase flow metering probe. The one or more load cells can be optical sensors and, in some examples, can be used in combination with other optical sensors located within the support rod sections, such as but not limited to, optical temperature and pressure sensors as described above.

Figure 3B:
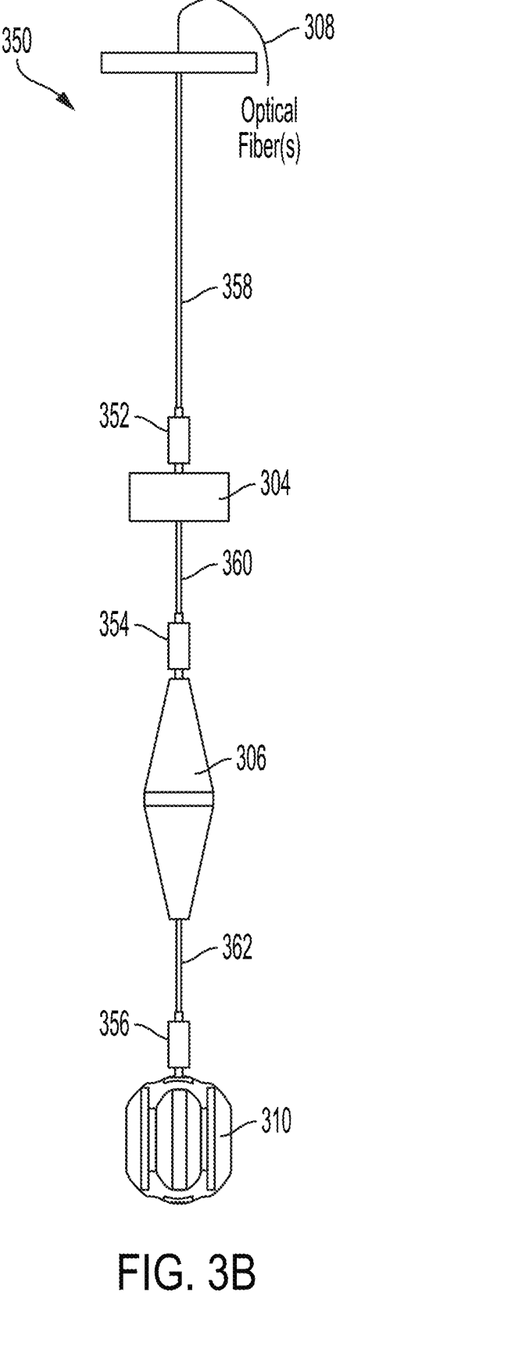
FIG. 3B is an assembled view of another multiphase flow metering probe according to one example of the present disclosure.

One example of such a multiphase flow metering probe 350 is depicted in FIG. 3B. In this particular example, the multiphase flow metering probe 350 is a variation of the multiphase flow metering probe 300 example of FIG. 3A, where the upstream connectors securing each of the flow conditioning elements 304, 306 and the acoustic element 310 to the outside of the support rod 302 may be replaced with a load cell 352, 354, 356. In such an example, an upstream end of each load cell 352, 354, 356 can be coupled to a downstream end of a respective support rod section 358, 360, 362 and a downstream end of each load cell can be coupled to the respective flow conditioning element 304, 306 or acoustic element 310. Such a construction may allow the multiphase flow metering probe 350 to be more sensitive to, and to measure more precisely, the strain associated with forces exerted on the support rod sections 358, 360, 362, flow conditioning elements 304, 306, etc., by a fluid flow in which the multiphase flow metering probe 350 is located.

The design and construction of the one or more load cells 352, 354, 356 can vary. For example, one or more of the load cells 352, 354, 356 may include a body portion and a connecting element at each of an upstream and downstream end thereof for coupling to a respective support rod section 358, 360, 362 and a respective flow conditioning element 304, 306 (or another support rod section). A compliant member may reside within the body portion of the load cell 352, 354, 356 and may be affixed at one end to an internal surface of the body portion and at the other end to one of the connecting elements, which may be partially located within the body portion and is permitted to move therein with some constrained degree of freedom. The optical fiber cable 308 running through the multiphase flow metering probe 350 again functions as an optical waveguide, as previously described.

An optical strain gauge can be associated with the compliant member of the one or more load cells 352, 354, 356 and can be communicatively coupled to the optical fiber cable 308. In some examples, the optical strain gauge may be a fiber Bragg grating (FBG) strain gauge. Strain produced by bending of the compliant member within the load cell body portion due to fluid flow forces exerted on the support rod sections 358, 360, 362 or on the flow conditioning element 304, 306 or acoustic element 310 to which the load cell 352, 354, 356 is coupled, can be measured by the optical strain gauge of the load cell, and strain readings may be transmitted to an optical interrogator via the optical fiber cable 308. A load cell according to examples of the present disclosure may also be temperature compensated. For example, a temperature-compensating FBG sensor that is communicatively coupled with the optical fiber cable 308 may be located within a separate cavity in the body portion of one or more of the load cells 352, 354, 356 for this purpose.

Figure 4:
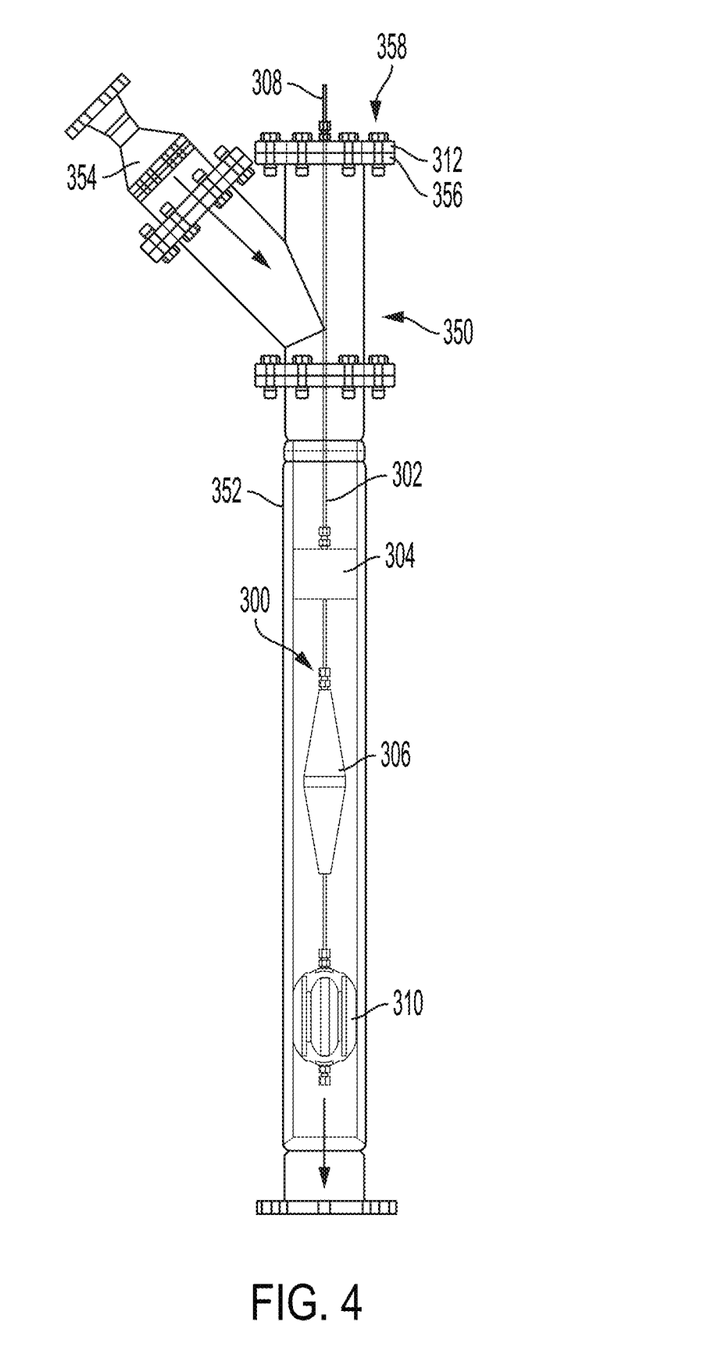
FIG. 4 depicts the multiphase flow metering probe of FIG. 2 installed within a vertically-oriented conduit to provide multiphase flow metering according to one example of the present disclosure.

FIG. 4 depicts the multiphase flow metering probe 300 of FIG. 3B installed in a vertically-oriented arrangement within a conduit 350, which is shown in both partial cross-section and partial transparency for clarity. The conduit 350 includes a vertically-oriented section 352 within which the multiphase flow metering probe 300 is installed, as well as a branch section 354 through which a multiphase fluid flows in the direction of the arrows into and through the vertically-oriented section 352. In this example, the branch section 354 of the conduit 350 may, for example, be coupled directly or indirectly to a wellhead. Likewise, the vertically-oriented section 352 may, for example, be a portion of a wellhead flow line that transports a well outflow to a downstream location such as for processing or storage. While not shown herein, the multiphase flow metering probe 300 can also be installed in a horizontally-oriented arrangement within a conduit. For example, the multiphase flow metering probe 300 can be installed in the horizontal section of the flow line 112 that is connected to the wellhead 110 in the example of FIG. 1.

As shown, a probe mounting flange 312 of the multiphase flow metering probe 300 is used to secure the multiphase flow metering probe 300 to an open upstream end of the conduit 350. The probe mounting flange 312 may be of the same or a similar construction as the probe mounting flange 222 of the multiphase flow metering probe 200 of FIG. 2, and may function in the same or a similar manner. For example, as shown in FIG. 4, the probe mounting flange 312 can mate with a receiving flange 356 located at the upstream end of the conduit 350, and may be secured thereto in a sealing manner by way of a series of threaded fastener assemblies 358. Other mechanisms for securing the probe mounting flange 312 to the receiving flange 356 of the conduit 350 are, of course, also possible, and would be understood by one of skill in the art.

In any case, it may be observed that the support rod 302 and the first and second flow conditioning elements 304, 306 are substantially centrally axially (concentrically) located within the conduit 350 and are substantially centered in the fluid flow passing through the conduit. As may also be understood by observance of FIG. 4, the multiphase fluid flows through the conduit in a downward direction, such that the fluid flow is conditioned by the first flow conditioning element 304 of the multiphase flow metering probe 300 before being subjected to measurement by the optical sensors (not shown) or contacting the second flow conditioning element 306 of the multiphase flow metering probe 300. A free end of the optical fiber cable 308 may extend from the support rod 302 and through the probe mounting flange 312 for connection with a measurement device such as an optical interrogator or another optical data acquisition system that can receive and measure signals generated by the one or more optical sensors. As shown in FIG. 4, the acoustic element 310 may have an outside diameter that is similar to the inside diameter of the vertically-oriented section 352 of the conduit 350 to which the multiphase flow metering probe 300 is installed. This can allow the acoustic element 310 to help center the support rod 302 within the conduit 350, as well as to support the downstream end of the support rod 302 against excessive bending or deformation by the fluid flow. The acoustic element 310 may perform a similar function when the multiphase flow metering probe 300 is installed in a horizontally-oriented arrangement within a conduit.

Figure 5:
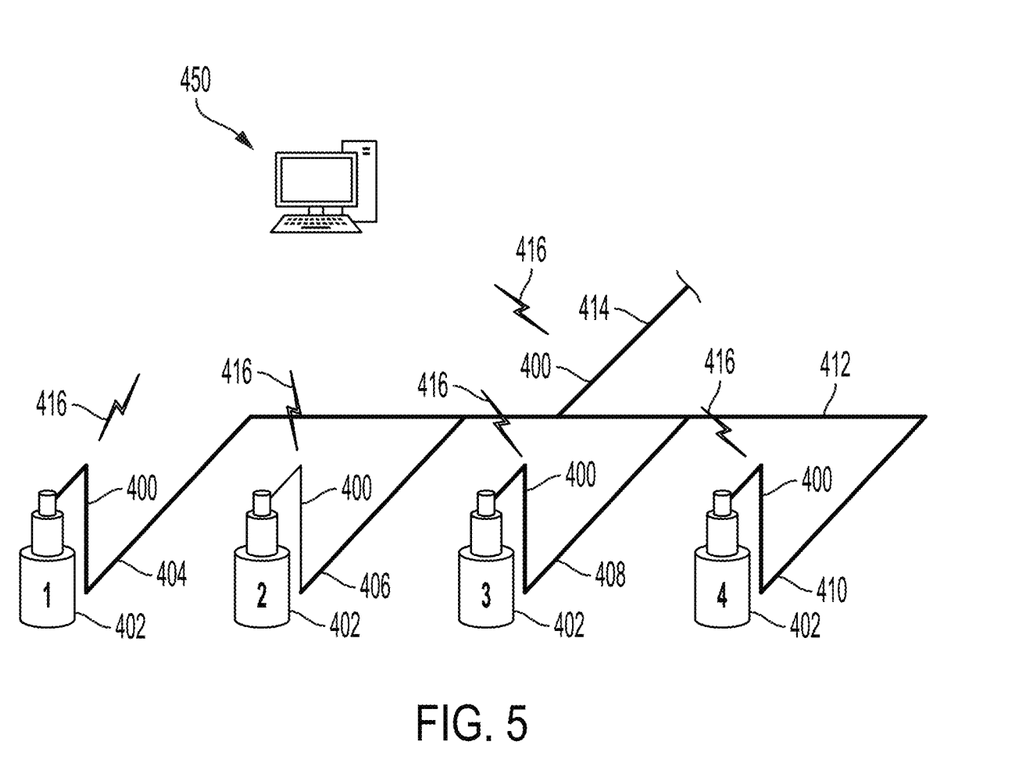
FIG. 5 schematically represents the installation and use of multiphase flow metering probes in a multi-well field.

FIG. 5 schematically represents a multiphase flow metering system involving the installation and use of a plurality of multiphase flow metering probes 400 in a multi-well field, such as an unconventional production field where the well outflow is multiphase in nature. In the example of FIG. 5, each of four completed hydrocarbon wells 1-4 is shown to include wellhead components 402 that may be used to, among other things, control the outflow of the respective hydrocarbon wells as would be familiar to one of skill in the art.

A plurality of well bore flow lines 404, 406, 408, 410 are respectively coupled to the wellhead components of each hydrocarbon well 1-4 to transport well outflow to another location, such as for processing or storage. A multiphase flow metering probe 400 is shown to be installed in a vertically-oriented section of each of the well bore flow lines 404-410 to respectively measure the multiphase flow produced by each of the hydrocarbon wells 1-4. While in this particular example, the multiphase flow metering probes 400 are installed in vertically-oriented sections of the well bore flow lines 404-410, multiphase flow metering probes can be installed within horizontally-oriented sections of the well bore flow lines in other examples.

Each of the well bore flow lines 404-410 terminates at a common flow line 412. The total production from all the hydrocarbon wells 1-4 is collected by the common flow line 412 and furthered toward another downstream location via a downstream flow line 414. Another multiphase flow metering probe 400 can be installed in the downstream flow line 414, or another conduit that receives the fluid flow from the downstream flow line 414, to measure the collective multiphase production from all the hydrocarbon wells 1-4. For purposes of illustration, the multiphase flow metering probe 400 is represented as being installed in a horizontally-oriented orientation in the downstream flow line 414 in FIG. 5, however, a vertically-oriented installation is also possible.

By installing like multiphase flow metering probes 400 in each of the well bore flow lines 404-410, as well as installing a like multiphase flow metering probe 400 in the downstream flow line 414 or at another location through which the total production of the collective hydrocarbon wells 1-4 flows, the fraction of the total multiphase fluid flow in the downstream flow line that is contributed by each well bore flow line (and each hydrocarbon well) can be determined. Consequently, a direct derivation of production allocation between each of the hydrocarbon wells 1-4 may also be accomplished. Further, because like multiphase flow metering probes 400 are preferably used at each measurement location, any measurement error of the multiphase flow metering probes 400 should be equivalently applied to each measured flow rate, thereby still allowing for an accurate assessment of production allocation.

As further represented in FIG. 5, in order to determine production allocation and for other possible analyses, the flow measurement data produced by each of the multiphase flow metering probes 400 may be transmitted to a computing device 450. For example, and as represented, a measurement device 416 may be associated with each of the multiphase flow metering probes 400 to receive signals generated by the optical sensors thereof, and may subsequently transmit fluid flow data to the computing device 450. In one or more other examples, at least the multiphase flow metering probes 400 installed to the well bore flow lines 404-410 leaving the wellhead components 402 may be collectively connected to a single optical interrogator or other optical data acquisition system, which may then transmit the data from all the associated multiphase flow metering probes 400 to the computing device 450.

Data may be transmitted from the measurement device(s) 416 to the computing device 450 by any technique known in the art. For example, the data transfer may occur over a network, in which case the network may be without limitation, a local area network (LAN), a wide-area network (WAN) such as the Internet, an institutional network, cellular or other wireless networks, etc.

The computing device 450 may be any computing device with sufficient processor and memory resources to perform the desired data analysis. In one or more examples according to the present disclosure, the computing device 450 includes a processor and memory communicatively coupled to the processor, the memory including instructions that are executable by the processor to cause the processor to perform operations.

The operations performed by the computing device 450 may include, for example, receiving fluid flow measurement data from the at least one optical data acquisition system and determining, based on received fluid flow data, one or more characteristics of the multiphase fluid flow. For example, the computing device 450 may use the measured flow rate for each well 1-4 in conjunction with measured total flow rate of the collective wells to determine the fraction of the total production attributable to each well. Such an installation can also provide a metering solution that allows for associated models and algorithms that receive data from the multiphase flow metering probes to automatically adjust, self-correct, or calibrate. In another example, the computing device 450 may use flow data generated by the multiphase flow metering probes 400 in a production optimization model to actively control production, such as by automatically adjusting one or more chokes to control flow. In some examples according to the present disclosure, the computing device 450 may employ one or more algorithms incorporating one or more machine learning models trained using one or a combination of physics-based models, empirical models, and experimental data. Data produced by the multiphase flow metering probes 400 may be stored, for example, at an online cloud-based data store.

While various examples are presented above relative to use of a multiphase flow metering probe for metering a multiphase fluid flowing from a well completion, it should also be understood that one or more examples of a multiphase flow metering probe according to the present disclosure can also be used in other settings, such as but not limited to, downstream production facilities, injection operations (e.g., water flood, steam injection, $CO_2$ sequestration), or as part of a sub-sea installation.

According to aspects of the present disclosure, a multiphase flow metering probe, a multiphase flow metering probe system, and a method of using a multiphase flow metering probe for metering a multiphase fluid flowing through a conduit, are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a multiphase flow metering probe installable in a flow line of the at least one hydrocarbon well, the multiphase flow metering probe comprising a unitary assembly of: an elongate support rod, an optical fiber cable located within the elongate support rod, at least one flow conditioning element attached to or integral with an outside surface of the elongate support rod, at least one optical sensor associated with the elongate support rod and communicatively coupled to the optical fiber cable, and a probe attachment element located at an upstream end of the elongate support rod and attachable to an open end of the flow line to secure the multiphase flow metering probe in the flow line; a measurement device communicatively coupled to the optical fiber cable to receive and measure signals generated by the at least one optical sensor relative to a multiphase fluid flow in the flow line; and a computing device communicatively coupled to the measurement device to receive fluid flow measurement data from the measurement device and to determine one or more characteristics of the multiphase fluid flow.

Example 2 is the system of example 1, wherein the at least one optical sensor is selected from the group consisting of a temperature sensor, a pressure sensor, a force sensor, a strain sensor, and various combinations thereof.

Example 3 is the system of example 1, further comprising an acoustic element attached to or integral with an outside surface of the elongate support rod.

Example 4 is the system of example 1, wherein the computing device comprises a processor and memory communicatively coupled to the processor, the memory including instructions that are executable by the processor to cause the processor to: determine, based on the fluid flow data received from the measurement device, a characteristic of the multiphase fluid flow that is selected from the group consisting of one or more phases, flow rate, velocity, absolute temperature, absolute pressure, differential pressure, density, and combinations thereof.

Example 5 is the system of example 1, wherein: a multiphase flow metering probe is installable in each flow line of a plurality of hydrocarbon wells; a multiphase flow metering probe is installable in a downstream flow line, to which each of the flow lines of the plurality of hydrocarbon wells is fluidly connected; at least one measurement device is communicatively coupled to the multiphase flow metering probes; and a memory of the computing device includes instructions that are executable by a processor of the computing device to cause the processor to receive fluid flow measurement data from the at least one measurement device relative to each of the multiphase flow metering probes.

Example 6 is the system of example 5, wherein the memory of the computing device includes instructions that are executable by the processor to cause the processor to determine, based on the fluid flow measurement data received from the at least one measurement device, a fraction of a total multiphase fluid flow in the downstream flow line that is contributed by each of the hydrocarbon wells.

Example 7 is a multiphase flow metering probe, comprising: a unitary assembly of: an elongate support rod having an upstream end and a downstream end; an optical fiber cable located within the elongate support rod and extending along a length of the elongate support rod; at least one flow conditioning element attached to or integral with an outside surface of the elongate support rod; at least one optical sensor associated with the elongate support rod at a location downstream of the at least one flow conditioning element, and communicatively coupled to the optical fiber cable; and a probe attachment element located at the upstream end of the elongate support rod and including at least one fastening mechanism for securing the multiphase flow metering probe within a flow line of a hydrocarbon well.

Example 8 is the multiphase flow metering probe of example 7, wherein the at least one optical sensor includes at least one optical temperature sensor and at least one optical pressure sensor.

Example 9 is the multiphase flow metering probe of example 7, wherein: the at least one flow conditioning element includes a first flow conditioning element, and a second flow conditioning element located downstream of the first flow conditioning element; the first flow conditioning element is a flow smoothing device designed to reduce fluid flow turbulence; and the second flow conditioning element is a flow restricting device designed to produce a localized pressure change in a fluid flow.

Example 10 is the multiphase flow metering probe of example 9, wherein: an optical temperature sensor resides at a location between the first flow conditioning element and the second flow conditioning element; a first optical pressure sensor resides at a location that is downstream of the optical temperature sensor but upstream of the second flow conditioning element; and a second optical pressure sensor resides at a location that is downstream of the second flow conditioning element; wherein pressure readings from the first and the second optical pressure sensors are usable to determine a differential pressure of a fluid flow associated with the flow line of the hydrocarbon well.

Example 11 is the multiphase flow metering probe of example 9, wherein: an optical force or optical strain sensor resides at a location between the first flow conditioning element and the second flow conditioning element; and another optical force or optical strain sensor resides at a location that is downstream of the second flow conditioning element; wherein readings from the optical force or optical strain sensors are usable to infer a differential pressure of a fluid flow associated with the flow line of the hydrocarbon well.

Example 12 is the multiphase flow metering probe of example 9, wherein: the flow smoothing device is selected from the group consisting of a folded vane flow conditioner, a tube-type flow conditioner, a fin-type flow conditioner, a Zanker-type flow conditioner, a fin-type flow conditioner, and a flow plate; and the flow restricting device is a reverse venturi or an orifice plate.

Example 13 is the multiphase flow metering probe of example 7, wherein the at least one optical sensor is a fiber Bragg grating sensor integrated within one or more optical fibers of the optical fiber cable.

Example 14 is the multiphase flow metering probe of example 7, further comprising an acoustic element attached to or integral with an outside surface of the elongate support rod, the acoustic element selected from the group consisting of a resonant device, a resonant cavity or chamber, a fluidic oscillator, and combinations thereof.

Example 15 is the multiphase flow metering probe of example 14, wherein the acoustic element is located at the downstream end of the elongate support rod.

Example 16 is a method comprising: installing, as a unitary assembly into a flow line of a hydrocarbon well, a multiphase flow metering probe comprising: an elongate support rod having an upstream end and a downstream end, an optical fiber cable located within the elongate support rod and extending along a length of the elongate support rod, at least one flow conditioning element attached to or integral with an outside surface of the elongate support rod, at least one optical sensor associated with the elongate support rod at a location downstream of the at least one flow conditioning element, and communicatively coupled to the optical fiber cable, and a probe attachment element located at the upstream end of the elongate support rod and including at least one fastening mechanism that engages an open receiving end of the flow line and secures the multiphase flow metering probe within the flow line; and generating, by the at least one optical sensor, signals indicating one or more characteristics of a multiphase fluid flowing through the flow line.

Example 17 is the method of example 16, wherein: the at least one optical sensor of the multiphase flow metering probe includes at least one optical temperature sensor and at least one optical pressure sensor; and an acoustic element is attached to or integral with an outside surface of the elongate support rod of the multiphase flow metering probe.

Example 18 is the method of example 16, further comprising: connecting a measurement device to the optical fiber cable to receive signals generated by the at least one optical sensor; communicatively coupling a computing device to the measurement device, the computing device including a processor and memory communicatively coupled to the processor, the memory including instructions that are executable by the processor to cause the processor to perform operations; and receiving, at the computing device from the measurement device, fluid flow data associated with the signals generated by the at least one optical sensor.

Example 19 is the method of example 18, further comprising, subsequent to receiving the fluid flow data from the measurement device at the computing device, determining by the processor, a characteristic of the multiphase fluid flow that is selected from the group consisting of flow rate, velocity, absolute temperature, absolute pressure, differential pressure, and density.

Example 20 is the method of example 18, further comprising, subsequent to receiving the fluid flow data from the measurement device at the computing device: running, by the processor, a production optimization model using the fluid flow data; and actively controlling, by the processor, production of the hydrocarbon well based on an output of the production optimization model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a multiphase flow metering probe installable in a flow line of at least one hydrocarbon well, the multiphase flow metering probe comprising a unitary assembly of:
an elongate hollow support rod,
an optical fiber cable located within the elongate hollow support rod,
at least one flow conditioning element attached to or integral with an outside surface of the elongate hollow support rod,
at least one optical sensor located within the elongate hollow support rod and communicatively coupled to the optical fiber cable, and
a probe attachment element located at an upstream end of the elongate hollow support rod and attachable to an open end of the flow line to secure the multiphase flow metering probe in the flow line;
a measurement device communicatively coupled to the optical fiber cable to receive and measure signals generated by the at least one optical sensor relative to a multiphase fluid flow in the flow line; and

17 a computing device communicatively coupled to the measurement device to receive fluid flow measurement data from the measurement device and to determine one or more characteristics of the multiphase fluid flow.

2. The system of claim 1, wherein the at least one optical sensor is selected from the group consisting of a temperature sensor, a pressure sensor, a force sensor, a strain sensor, and various combinations thereof.

3. The system of claim 1, further comprising an acoustic element attached to or integral with an outside surface of the elongate hollow support rod.

4. The system of claim 1, wherein the computing device comprises a processor and memory communicatively coupled to the processor, the memory including instructions that are executable by the processor to cause the processor to:

determine, based on the fluid flow data received from the measurement device, a characteristic of the multiphase fluid flow that is selected from the group consisting of one or more phases, flow rate, velocity, absolute temperature, absolute pressure, differential pressure, density, and combinations thereof.

5. The system of claim 1, wherein:

a multiphase flow metering probe is installable in each flow line of a plurality of hydrocarbon wells;

a multiphase flow metering probe is installable in a downstream flow line, to which each of the flow lines of the plurality of hydrocarbon wells is fluidly connected;

at least one measurement device is communicatively coupled to the multiphase flow metering probes; and a memory of the computing device includes instructions that are executable by a processor of the computing device to cause the processor to receive fluid flow measurement data from the at least one measurement device relative to each of the multiphase flow metering probes.

6. The system of claim 5, wherein the memory of the computing device includes instructions that are executable by the processor to cause the processor to determine, based on the fluid flow measurement data received from the at least one measurement device, a fraction of a total multiphase fluid flow in the downstream flow line that is contributed by each of the hydrocarbon wells.

7. A multiphase flow metering probe, comprising:

a unitary assembly of:

an elongate hollow support rod having an upstream end and a closed downstream end;

an optical fiber cable located within the elongate hollow support rod and extending along a length of the elongate hollow support rod;

at least one flow conditioning element attached to or integral with an outside surface of the elongate hollow support rod;

at least one optical sensor located within the elongate hollow support rod, and communicatively coupled to the optical fiber cable; and a probe attachment element located at the upstream end of the elongate hollow support rod and including at least one fastening mechanism for securing the multiphase flow metering probe within a flow line of a hydrocarbon well.

8. The multiphase flow metering probe of claim 7, wherein the at least one optical sensor includes at least one optical temperature sensor and at least one optical pressure sensor.

18

9. The multiphase flow metering probe of claim 7, wherein:

the at least one flow conditioning element includes a first flow conditioning element, and a second flow conditioning element located downstream of the first flow conditioning element;

the first flow conditioning element is a flow smoothing device designed to reduce fluid flow turbulence; and the second flow conditioning element is a flow restricting device designed to produce a localized pressure change in a fluid flow.

10. The multiphase flow metering probe of claim 9, wherein:

an optical temperature sensor resides at a location between the first flow conditioning element and the second flow conditioning element;

a first optical pressure sensor resides at a location that is downstream of the optical temperature sensor but upstream of the second flow conditioning element; and a second optical pressure sensor resides at a location that is downstream of the second flow conditioning element;

wherein pressure readings from the first and the second optical pressure sensors are usable to determine a differential pressure of a fluid flow associated with the flow line of the hydrocarbon well.

11. The multiphase flow metering probe of claim 9, wherein:

an optical force or optical strain sensor resides at a location between the first flow conditioning element and the second flow conditioning element; and another optical force or optical strain sensor resides at a location that is downstream of the second flow conditioning element;

wherein readings from the optical force or optical strain sensors are usable to infer a differential pressure of a fluid flow associated with the flow line of the hydrocarbon well.

12. The multiphase flow metering probe of claim 9, wherein:

the flow smoothing device is selected from the group consisting of a folded vane flow conditioner, a tube-type flow conditioner, a fin-type flow conditioner, a Zanker-type flow conditioner, a fin-type flow conditioner, and a flow plate; and the flow restricting device is a reverse venturi or an orifice plate.

13. The multiphase flow metering probe of claim 7, wherein the at least one optical sensor is a fiber Bragg grating sensor integrated within one or more optical fibers of the optical fiber cable.

14. The multiphase flow metering probe of claim 7, further comprising an acoustic element attached to or integral with an outside surface of the elongate hollow support rod, the acoustic element selected from the group consisting of a resonant device, a resonant cavity or chamber, a fluidic oscillator, and combinations thereof.

15. The multiphase flow metering probe of claim 14, wherein the acoustic element is located at the downstream end of the elongate hollow support rod.

16. A method comprising:

installing, as a unitary assembly into a flow line of a hydrocarbon well, a multiphase flow metering probe comprising:

an elongate hollow support rod having an upstream end and a closed downstream end, an optical fiber cable located within the elongate hollow support rod and extending along a length of the elongate hollow support rod, at least one flow conditioning element attached to or integral with an outside surface of the elongate hollow support rod, at least one optical sensor located within the elongate hollow support rod at a location downstream of the at least one flow conditioning element, and the at least one optical sensor communicatively coupled to the optical fiber cable and isolated from a multiphase fluid flowing through the flow line by the elongate hollow support rod, and a probe attachment element located at the upstream end of the elongate hollow support rod and including at least one fastening mechanism that engages an open receiving end of the flow line and secures the multiphase flow metering probe within the flow line; and generating, by the at least one optical sensor, signals indicating one or more characteristics of the multiphase fluid flowing through the flow line.

17. The method of claim 16, wherein:

the at least one optical sensor of the multiphase flow metering probe includes at least one optical temperature sensor and at least one optical pressure sensor; and an acoustic element is attached to or integral with an outside surface of the elongate hollow support rod of the multiphase flow metering probe.

18. The method of claim 16, further comprising:

connecting a measurement device to the optical fiber cable to receive signals generated by the at least one optical sensor;

communicatively coupling a computing device to the measurement device, the computing device including a processor and memory communicatively coupled to the processor, the memory including instructions that are executable by the processor to cause the processor to perform operations; and receiving, at the computing device from the measurement device, fluid flow data associated with the signals generated by the at least one optical sensor.

19. The method of claim 18, further comprising, subsequent to receiving the fluid flow data from the measurement device at the computing device, determining by the processor, a characteristic of the multiphase fluid flow that is selected from the group consisting of flow rate, velocity, absolute temperature, absolute pressure, differential pressure, and density.

20. The method of claim 18, further comprising, subsequent to receiving the fluid flow data from the measurement device at the computing device:

running, by the processor, a production optimization model using the fluid flow data; and actively controlling, by the processor, production of the hydrocarbon well based on an output of the production optimization model.

* * * * *